(No Model.) 2 Sheets—Sheet 2.
N. W. REW.
HARROW ATTACHMENT.
No. 361,836. Patented Apr. 26, 1887.
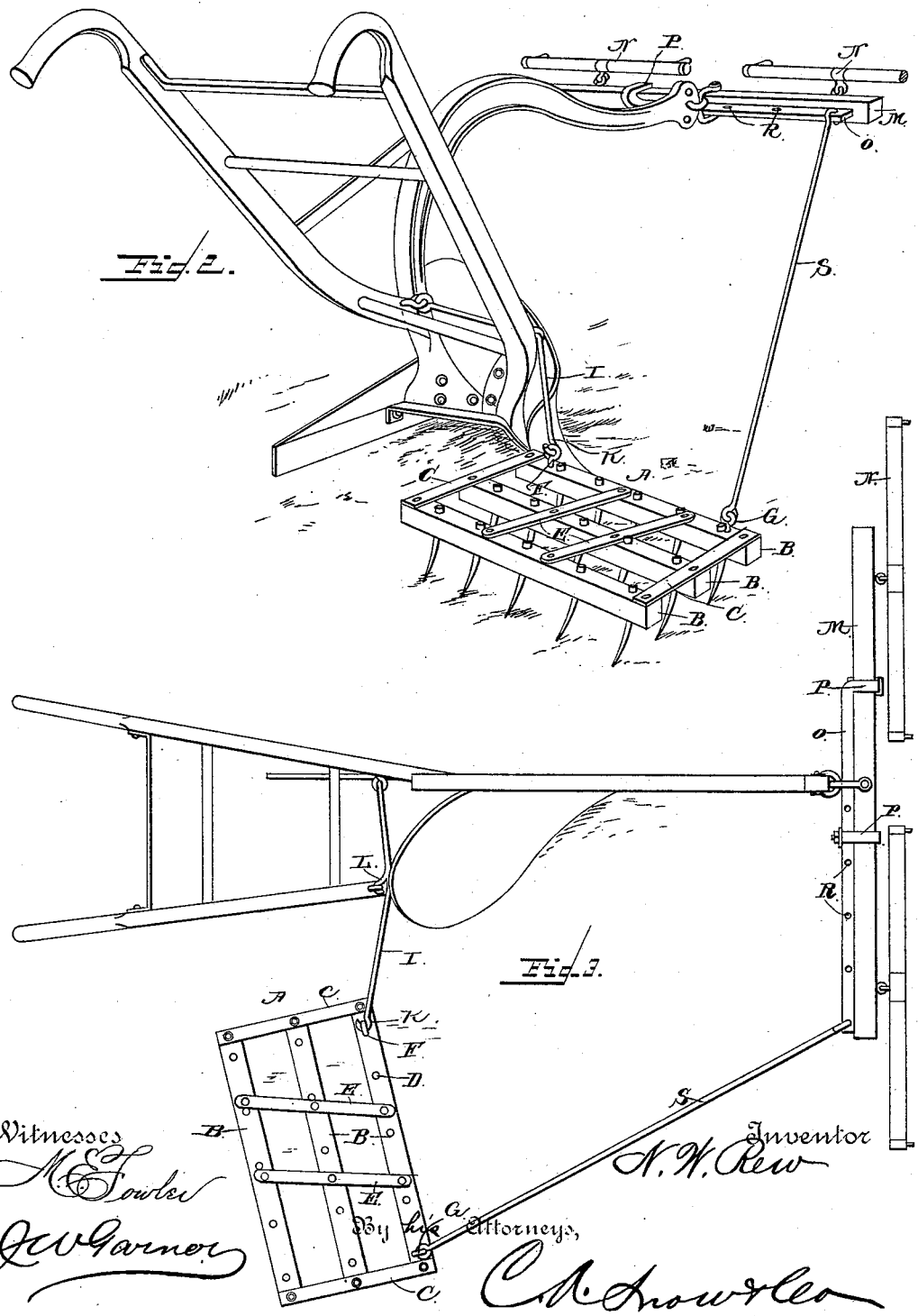

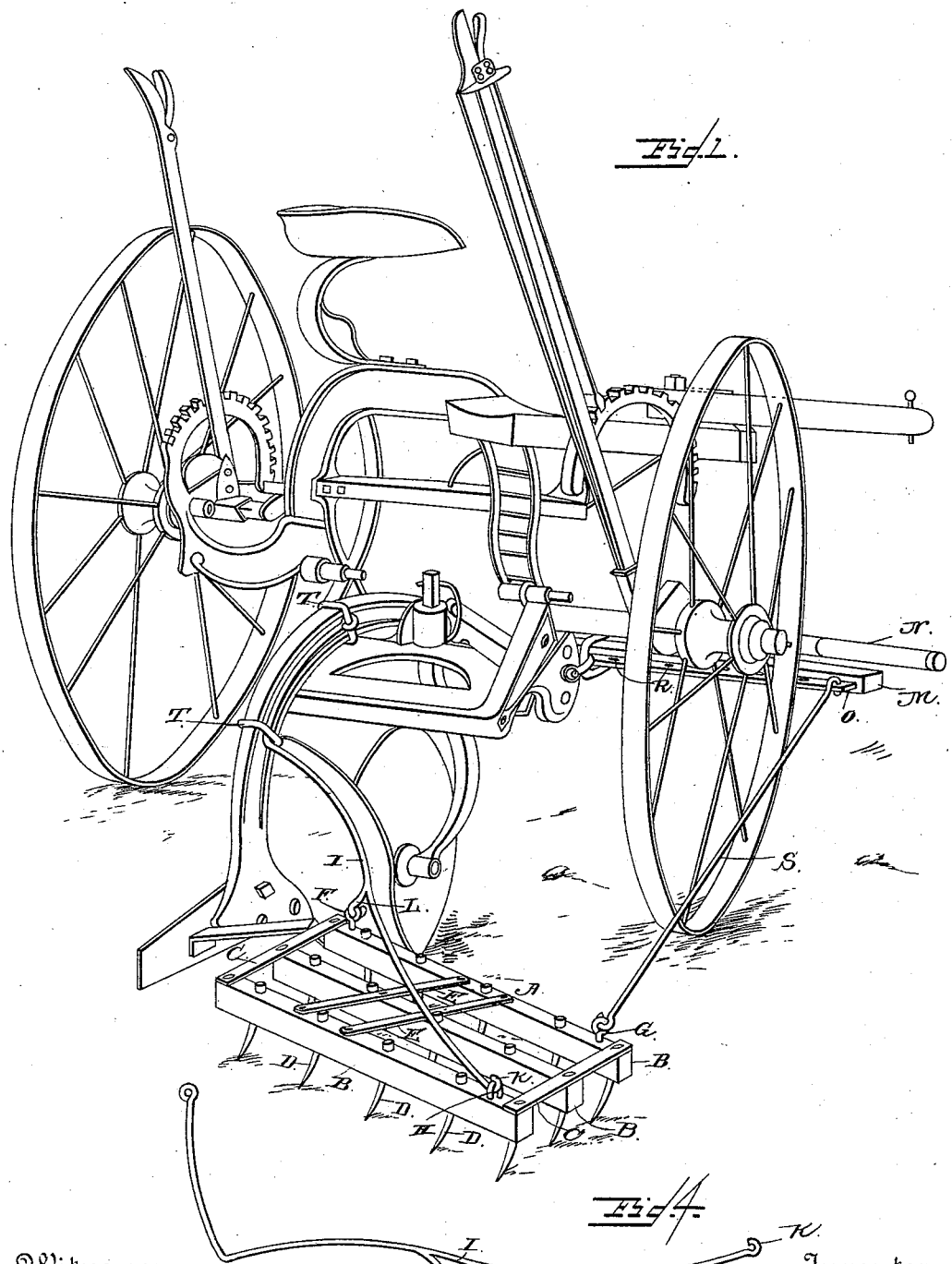

UNITED STATES PATENT OFFICE.

NOEL WESTON REW, OF GARDEN CITY, MINNESOTA.

HARROW ATTACHMENT.

SPECIFICATION forming part of Letters Patent No. 361,836, dated April 26, 1887.

Application filed March 3, 1887. Serial No. 229,607. (No model.)

*To all whom it may concern:*

Be it known that I, NOEL WESTON REW, a citizen of the United States, residing at Garden City, in the county of Blue Earth and State of Minnesota, have invented a new and useful Improvement in Harrow Attachments, of which the following is a specification.

My invention relates to an improvement in harrow attachments for plows; and it consists in the peculiar construction and combination of devices, that will be more fully set forth hereinafter, and particularly pointed out in the claims.

This invention is an improvement upon the harrow attachment for plows for which Letters Patent of the United States, No. 347,380, were granted to me August 17, 1886.

In the drawings, Figure 1 is a perspective view of a sulky-plow, looking at the rear side thereof, and showing my improved devices for attaching a harrow thereto. Fig. 2 is a similar view of a walking-plow, showing my harrow attached thereto. Fig. 3 is a top plan view of the same. Fig. 4 is a detached perspective view of the rod for attaching the harrow to the plow.

A represents a harrow comprising three parallel bars, B, having their ends connected by cross-bars C. The bars B are provided with harrow-teeth D, and are braced by means of obliquely-arranged rods E. At the inner front corner of the harrow is formed an eye, F. At the outer front corner thereof is a similar eye, G, and at the outer rear corner of the harrow is an eye, H. I represents a rod, which is adapted to attach the harrow to one side of a plow and in rear thereof. The said rod is curved, as shown at Fig. 4, is provided at its outer end with a hook, K, and near its center with a similar hook, L.

M represents a whiffletree, which is connected to the clevis at the front end of the plow-beam in the usual manner. The said whiffletree has the single-trees N, attached near its ends, and on the rear side of the whiffletree is arranged an evener-arm, O. The said evener-arm is attached to the mold-board end of the whiffletree by means of clip-bolts P, which enable it to be adjusted longitudinally on the whiffletree, and the said evener-bar is provided with a series of openings, R, which extend from its outer end to a point within a suitable distance of its inner end.

S represents a draft rod, which has its front end hooked into one of the openings R of the evener-bar and has its rear end connected to the eye G of the harrow at the outer front end thereof. When the harrow is to be attached to a sulky-plow, as shown at Fig. 1, the inner portion of the curved rod I is secured to the curved plow-standard by means of the clip-bolts T, so as to hold the said rod firmly thereto. The hook K at the extreme outer end of the rod is connected to the eye H at the outer rear corner of the harrow, and the hook L of the said rod is connected to the eye F at the inner front corner of the harrow, and thereby the rod extends diagonally across the harrow, and the latter is supported on one side of the plow and slightly in rear of the same, so that it is adapted to harrow the ground while it is being plowed, and thus effect an economy of time and labor.

It will be observed that the draft of the harrow is sustained almost entirely by the rod S, and that the rod I only serves to connect the harrow rigidly to the plow, so as to keep it pressed firmly down in engagement with the ground when the plow and harrow are in operation. Another useful purpose is gained by thus securing the harrow rigidly to the plow, inasmuch as when the latter is raised from the ground by means of the usual lever with which the sulky-frame is provided the harrow will be also raised from the ground, and thus there is no necessity for providing a separate lever to raise the harrow; nor is any additional attention required of the plowman by reason of the harrow being attached to the plow.

When the harrow is attached to a walking-plow, as shown in Figs. 2 and 3, the curved rod I has its inner portion secured transversely on the lower front portions of the plow-handles, and the hook K at the outer end of the said rod is engaged with the eye F at the inner front corner of the harrow.

By connecting the draft-rod to the whiffletree, through the medium of the evener-bar, a portion of the power of the horses is exerted directly upon the harrow, so as to draw the same independently of the plow, and thus the harrow is prevented from exerting lateral or side pressure on the plow to render it difficult for the plowman to guide the latter. By making the said evener-bar adjustable longitudinally on the whiffletree, and by providing the said evener-bar with a series of openings, whereby the draft-rod may be attached thereto at any desired point, the load may be divided between the horses, so that each will only be caused to exert as much power as is required of the other.

By reference to Fig. 3 it will be understood that when the plowman raises the plow from the ground the harrow will move with the plow and will be also raised from the ground.

Having thus described my invention, I claim—

1. The combination of the plow, the harrow arranged at one side of the plow and rigidly attached thereto, a whiffletree attached to the plow, and a draft-rod connected to the harrow and the whiffletree, one end of the rod being adjustably connected to the whiffletree, as and for the purpose described.

2. The combination of the plow, the harrow attached to one side thereof, a whiffletree connected to the front of the plow, an endwise-movable evener loosely connected to the whiffletree, and a draft-rod intermediate the harrow and evener, the front end of said rod being adjustably connected to the evener, substantially as described.

3. The combination of the plow, the whiffletree attached thereto, the harrow attached to one side of the plow, and the draft-rod connecting the harrow with the whiffletree, the said draft-rod being adapted to be attached to the whiffletree at any desired distance from the end thereof, substantially as described.

4. The combination of the plow, the whiffletree attached thereto, the harrow attached to one side of the plow, the evener-bar attached to the whiffletree and adjustable longitudinally thereon, and the draft-rod connecting the harrow with the evener-bar, substantially as described.

5. The combination of the plow, a harrow arranged at one side thereof, and a rod, I, extending diagonally over the harrow and connected at two points of its length to the harrow, the inner end of the rod being fixed to the plow, substantially as described, for the purpose set forth.

In testimony that I claim the foregoing as my own I have hereto affixed my signature in presence of two witnesses.

NOEL WESTON REW.

Witnesses:
A. J. STACKPOLE,
B. A. RITCHIE.